(12) United States Patent
Chen

(10) Patent No.: US 6,256,383 B1
(45) Date of Patent: Jul. 3, 2001

(54) IIR FILTER OF ADAPTIVE BALANCE CIRCUIT FOR LONG TAIL ECHO CANCELLATION

(75) Inventor: Herbert M. K. Chen, Saratoga, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 08/966,307

(22) Filed: Nov. 7, 1997

(51) Int. Cl.$^7$ ........................................... H04M 9/00
(52) U.S. Cl. ........................... 379/411; 379/410; 370/291
(58) Field of Search ..................... 379/410, 411, 379/406, 407, 408, 409, 345; 370/286, 287, 291; 708/322

(56) References Cited

U.S. PATENT DOCUMENTS

| | | | |
|---|---|---|---|
| 3,787,645 | * | 1/1974 | Ochiai et al. .................. 379/410 |
| 4,862,449 | * | 8/1989 | Hoefkens et al. ............... 370/32.1 |
| 4,868,874 | * | 9/1989 | Takatori et al. ................ 379/411 |
| 5,014,263 | | 5/1991 | Vairavan et al. ................ 379/406 |
| 5,084,865 | | 1/1992 | Koike .......................... 379/406 |
| 5,274,705 | * | 12/1993 | Younce et al. .................. 379/410 |
| 5,311,503 | * | 5/1994 | Kokubo et al. ................. 370/32.1 |
| 5,521,908 | * | 5/1996 | Younce et al. .................. 379/410 |
| 5,526,347 | | 6/1996 | Chen et al. .................... 379/410 |
| 5,559,881 | * | 9/1996 | Sih ............................ 379/410 |
| 5,631,900 | | 5/1997 | McCaslin et al. ............... 379/411 |
| 5,649,010 | * | 7/1997 | Gysel et al. ................... 379/406 |
| 5,663,955 | * | 9/1997 | Iyengar ........................ 370/291 |
| 5,664,011 | * | 9/1997 | Crochiere et al. ............... 379/410 |
| 5,675,612 | | 10/1997 | Solve et al. ................... 375/326 |
| 5,708,474 | * | 1/1998 | Hong .......................... 348/448 |
| 5,790,440 | * | 8/1998 | Fujii et al. ................... 364/724.19 |

OTHER PUBLICATIONS

A. Kaelin et al., "Linear Echo Cancellation Using Optimized Recursive Prefiltering", Proc. IEEE Int. Symp. on Circuits and Systems, Chicago, pp. 463–466, May 1993.*

* cited by examiner

*Primary Examiner*—Wing F. Chan
(74) *Attorney, Agent, or Firm*—Amin & Turocy, LLP

(57) ABSTRACT

An automatic balance system for a transmit signal of a wireless local loop communication system. The automatic balance system includes a finite impulse response (FIR) filter system, the FIR filter system including at least one FIR tap for replicating at least one portion of an echo signal, the echo signal being an undesired component of the transmit signal. The system also includes a non-adaptive infinite impulse response (IIR) filter system operatively coupled to the FIR filter system, the non-adaptive IIR filter system including an IIR tap for replicating a long-tail portion of the echo signal. A first summer is operatively coupled to the FIR filter system and non-adaptive IIR filter system, the first summer combining the output replicated portions of the echo signal from the FIR filter system and the IIR filter system to generate a replicated echo signal. A second summer combines an inverted replicated echo signal with the transmit signal so as to substantially negate the echo signal from the transmit signal.

17 Claims, 3 Drawing Sheets

IIR FILTER OF ADAPTIVE BALANCE CIRCUIT FOR LONG TAIL ECHO CANCELLATION

FIELD OF THE INVENTION

The invention herein described relates generally to canceling echoes from a 2 to 4 wire hybrid, and more particularly to an infinite impulse response (IIR) filter of an adaptive balance system for long tail echo cancellation in a wireless local loop (WLL) system.

BACKGROUND OF THE INVENTION

Since the advent of the telephone system, copper wire was traditionally provided as the link in a "local loop" between a telephone subscriber and a local exchange. In spite of the 600 million telephone lines currently in use, four-fifths of the global population have never used a phone. This situation is rapidly changing as countries realize the relationship between a solid communications infrastructure and national prosperity. Countries with developing economies are faced with delivering cost-effective plain old telephone service (POTS) to hundreds of millions of impatient future subscribers. Installing twisted-pair bundles throughout the countryside or through crowded metropolitan areas is a slow, often uneconomic proposition. In some countries, wire laid between the customer premise and the local exchange in daylight hours is ripped up at night, to be sold for the value of the copper. Installing a twisted-pair-based public infrastructure requires immense amounts of time and money.

Wireless local loop (WLL) technology, used to complete the "last mile" of the subscriber loop, appears assured of being the technology solution of choice for the exploding worldwide telecommunications market. However, while WLL systems avoid the costs and delays associated with laying copper cable as an infrastructure or bypass solution, the convenience of a wireless solution presents new technological challenges. Key among them is achieving wireline voice quality in a wireless solution.

For equivalent performance, WLL systems require more elaborate transhybrid balance networks than traditional wired telephone systems. Due to the longer time delays in the speech path and the unpredictability of the terminating impedance, it is almost impossible to choose a single compromise balance network that will consistently deliver ideal transhybrid performance in a WLL system.

In a nonmobile wireless local loop system, the wireless basestation typically connects to the local exchange via a standard interface. The customer premise equipment consists of a box on the side of a house, which contains the radio unit and synthesizes the POTS interface. The customer terminal equipment (telephone, fax etc.) then plugs into the house side box in the same manner as with a wireline system.

The primary differences between a WLL system and a wired system are that the WLL system typically incorporates some type of speech compander, such as adaptive differential pulse code modulation (ADPCM), and the final wired loop from the box at the house to the terminal equipment is very short. Speech companders are generally employed to improve speech quality. As a consequence of using a wireless system, round-trip delays of up to 40 ms can occur with the dominant source of delay being a baseband protocol processor.

A potential source of echo is caused by a mismatch in impedances between the customer's terminal equipment and the balance network residing in the POTS interface. In short loops, such as those in a WLL network, the 2-wire impedance is dominated by the terminal equipment only, since the line is so short its impedance is insignificant. By contrast, in a traditional wireline system, the line can be very long, in which case the characteristic impedance of the line dominates, and the impedance of the terminal equipment becomes irrelevant. For this reason, it is usually possible to achieve acceptable performance by using a fixed but compromised balance network in a wired system.

Transhybrid balance is a name given to the degree of echo cancellation, for example, in a WLL system. Transhybrid balance is the ratio of the reflected signal to the transmitted signal (as viewed from the 4-wire side). In a WLL system, it is desirable to perform the transhybrid balance function near the customer's terminal equipment where the echo delay is a minimum. An attempt to perform this function at the wireless basestation or at the local exchange would require a more complicated network because of the increased delays the signal encounters while passing through the companders in the basestation and the box at the house. Due to the complicated nature of automatic transhybrid balance, it is best handled by a digital signal processor (DSP). If the coded function is DSP-based, the balance network may be implemented in the programmable digital domain.

The general implementation of automatic balance is handled in the following manner. An adaptive balance filter performs an estimate of an echo-path impulse response and dynamically adjusts a set of digital-filter coefficients to create an echo replica. This echo replica is inverted and summed into the transmit path to cancel the echo component in the transmit signal. The adaptation process using the echo residual signal to adjust the echo replica is repeated until the best echo cancellation is achieved. The net effect is that the trans-hybrid loss is kept to a minimum regardless of changing line or subscriber loop conditions.

A problem with many conventional automatic balance systems is that they employ a large number of finite impulse response (FIR) filter taps (e.g., 32 taps) in order to properly replicate the echo signal. The cost of an FIR filter is a function of the number of taps and thus FIR filters for many automatic balance systems tend to be rather expensive. In some automatic balance systems the FIR filter has associated therewith an adaptive infinite impulse response (IIR) filter. The adaptive IIR filter serves to reduce the number of taps required in the FIR filter since the IIR filter can generate an echo replica for a substantial portion of the echo signal provided that the echo signal is monotonically decaying. However, conventional automatic balance systems which employ an adaptive IIR filter are still very expensive and complicated because of the adaptive aspect of the IIR filter. In other words, the poles/zeros employed in the adaptive IIR filters dynamically change in order to provide an optimal long-tail echo replica. In order to implement such an adaptive IIR filter a complicated and expensive circuitry is generally required.

In view of the above, there is a need in the art for a simple and economical automatic balance system for canceling echo effects in WLL systems.

SUMMARY OF THE INVENTION

The present invention provides an automatic balance system and method that are particularly useful in a wireless local loop (WLL) system. The system and method are characterized by the use of an adaptive finite impulse response (FIR) filter system in combination with a non-adaptive infinite impulse response (IIR) filter system which together replicate an inverted echo signal for substantially negating an echo signal in a transmit signal, which echo signal may be a signal reflected, for example, from a 2 to 4 wire hybrid in a WLL system. The use of a non-adaptive IIR filter system eliminates the complexity and expense of previously used adaptive IIR filters, which also may exhibit stability problems.

In a preferred embodiment of an automatic balance system, the FIR filter system includes one or more FIR taps for replicating a leading portion of an echo signal, whereas the non-adaptive IIR filter system provides for replication of a remaining or tail portion of the echo signal. Such a system is particularly useful when echo signal characteristically exhibits a generally smooth, monotonically decaying tail, herein referred to as a long-tail echo.

According to one specific aspect of the present invention, an automatic balance system for a wireless local loop communication system, comprising filter circuitry for producing an inverted replica of an echo signal in the transmit signal, the filter circuitry including: one or more finite impulse response (FIR) taps for replicating a leading portion of the echo signal, and a non-adaptive infinite impulse response (IIR) filter for replicating a tail portion of the echo signal and the associated adaptation control circuitry.

In accordance with another embodiment of the present invention, the aforementioned aspect of the present invention is used in combination with a wireless local loop communication system, the system including a hybrid conversion system to which the transmit signal is sent and from which the echo signal is reflected.

Another aspect of the present invention provides for a method for canceling an echo signal from a transmit signal in a wireless local loop communication system, including the steps of: using one or more finite impulse response (FIR) taps to replicate a leading portion of the echo signal, using a non-adaptive infinite impulse response (IIR) filter arrangement to replicate a tail portion of the echo signal, and inverting and combining the replicas of the leading and trailing portions with the echo signal in the transmit signal, thereby substantially to cancel the echo signal.

In accordance with another aspect of the present invention, an automatic balance system for a transmit signal of a wireless local loop communication system includes: a finite impulse response (FIR) filter system, the FIR filter system including at least one FIR tap for replicating at least one portion of an echo signal, the echo signal being an undesired component of the transmit signal; a non-adaptive infinite impulse response (IIR) filter system operatively coupled to the FIR filter system, the non-adaptive IIR filter system including an IIR tap for replicating a long-tail portion of the echo signal; a first summer operatively coupled to the FIR filter system and non-adaptive IIR filter system, the first summer combining the output replicated portions of the echo signal from the FIR filter system and the IIR filter system to generate a replicated echo signal, and a second summer for combining an inverted replicated echo signal with the transmit signal so as to substantially negate the echo signal from the transmit signal.

Yet another aspect of the present invention provides for an echo canceller adapted for connection to a 4-wire section of a 2 to 4 wire conversion circuit which includes: a finite impulse response (FIR) filter system operatively coupled to the 4-wire section of the 2 to 4 wire conversion circuit, the FIR filter system including at least one FIR tap for replicating at least one portion of an echo signal, the echo signal being an undesired component of the transmit signal; a non-adaptive infinite impulse response (IIR) filter system operatively coupled to the FIR filter system, the non-adaptive IIR filter system including an IIR tap for replicating a long-tail portion of the echo signal the non-adaptive IIR filter system further including at least one amplifier, the gain of the amplifier corresponding to a decay rate of the long-tail portion of the echo signal; a first summer operatively coupled to the FIR filter system and non-adaptive IIR filter system, the first summer combining the output replicated portions of the echo signal from the FIR filter system and the IIR filter system to generate a replicated echo signal, and a second summer for combining an inverted replicated echo signal with the transmit signal so as to substantially negate the echo signal from the transmit signal; wherein a filter coefficient ($W_{k,7}$) for the non-adaptive IIR filter system is determined based on the equation:

$$w_{k+1,7} = w_{k,7} + \Delta * e_k * \text{sign} \sum_{n=7}^{\infty} x_{k-n} * a^{n-7}$$

wherein k represents a discrete time sampling interval; $\Delta$ is an adaptation step signal; $e_k$ is the error signal; and sign $\Sigma$ . . . is a sign value of an accumulated receive signal ($x_k$) times a decaying factor (a).

Another aspect of the present invention provides for a method for echo cancellation including the steps of: using a finite impulse response (FIR) filter system operatively coupled to a 4-wire section of a 2 to 4 wire conversion system, the FIR filter system including at least one FIR tap for replicating at least one portion of an echo signal; using a non-adaptive infinite impulse response (IIR) filter system, operatively coupled to the FIR filter system, to replicate a long-tail portion of the echo signal, the non-adaptive IIR filter system further including at least one amplifier, the gain of the amplifier corresponding to a decay rate of the long-tail portion of the echo signal; using a first summer, operatively coupled to the FIR filter system and non-adaptive IIR filter system, to combine the output replicated portions of the echo signal from the FIR filter system and the IIR filter system to generate a replicated echo signal, and using a second summer to combine an inverted replicated echo signal with the transmit signal so as to substantially negate an echo signal component of the transmit signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
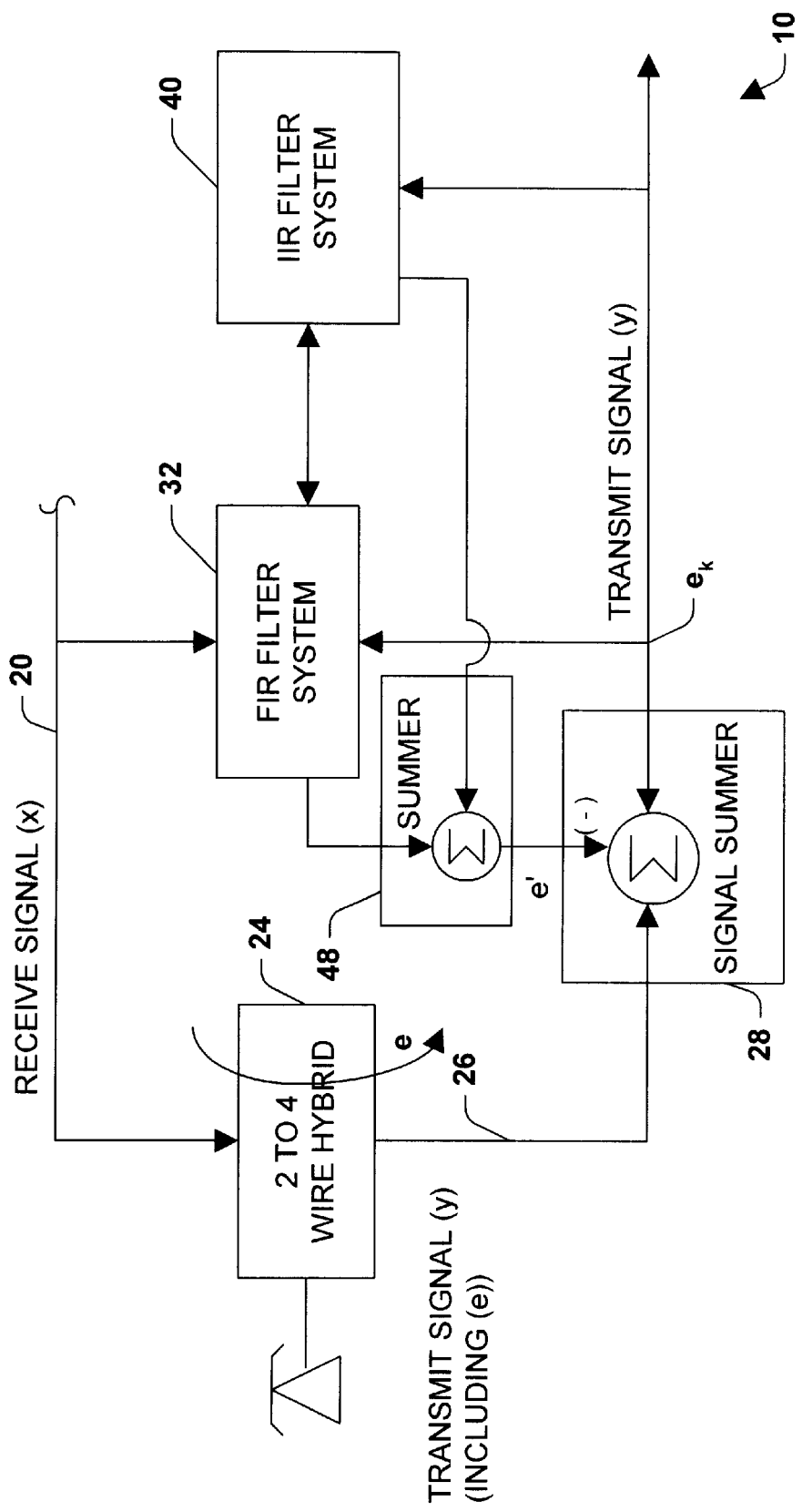
FIG. 1 is a schematic block diagram of an automatic balance system including an adaptive FIR filter system and non-adaptive IIR filter system in accordance with he present invention.

The present invention will now be described with reference to the drawings, wherein like reference numerals are used to refer to like elements throughout.

Referring initially to FIG. 1, a schematic block diagram of an automatic balance system 10 including an adaptive FIR filter system 32 and non-adaptive IIR filter system 40 in accordance with the present invention is shown. A receive signal (x) is input via line 20 to a 2 to 4 wire hybrid converter 24. In telephone circuits, for reasons of line economics and easy replaceability, a 2-wire configuration is generally adopted for a subscriber line that is connected to a subscriber's telephone set. The 2-wire configuration constitutes a configuration wherein a single pair of wires is provided to carry signals in both directions. However, the line to which the subscriber line is connected is converted to a 4-wire configuration which provides separate paths for each direction that is adopted.

The subscriber lines typically differ in type and length—therefore each subscriber line has its own associated impedance. The 2 to 4-wire hybrid converter 24 not only passes the signal received from the distant party via the 4-wire line to the local party via the subscriber 2-wire line, but also acts as an echo path. This echo path allows the received signal (x) to leak over to the transmitting side, where it becomes an echo signal (e) that may degrade communication quality. The strength of the echo signal in the transmit signal (y) is usually a function of the 2-wire loop terminating impedance.

Accordingly, the signal transmitted on line 26 includes the transmit signal (y) from the hybrid converter 24 which also includes an echo signal (e) resulting from leakage in the hybrid converter 24. The transmit signal (y) is input into a signal summer 28 wherein it is summed with an inverted replica of the echo signal (e'). This summing process negates or cancels the echo signal component (e) from the transmit signal (y), if (e') is nearly equal to (e).

In accordance with the present invention, the echo replica (e') is generated by the automatic balance system 10 which includes an FIR filter system 32 and non-adaptive IIR filter system 40. The FIR filter system 32 may be of a conventional type including one or more FIR filter taps. However, as will be appreciated, the number of FIR filter taps may be considerably less than the number employed in prior art automatic balance systems. As indicated above, prior art automatic balance systems have been known to use as many as 32 FIR taps; whereas the present invention affords for use of less than 10 FIR taps. In the illustrated preferred embodiment, 7 FIR taps are used—each tap may be a conventional type or any type suitable for carrying out the present invention. The non-adaptive IIR filter system 40 includes at least one non-adaptive IIR filter tap and in the preferred embodiment only one non-adaptive IIR filter tap.

The FIR filter system 32 and the non-adaptive IIR filter system 40 serve to replicate the echo component (e) in the transmit signal (y). As noted above, the transmit signal (y) outputted from the signal summer 28 may include an echo component (e). The echo residual ($e_k$) is input into the FIR filter system 32 and the non-adaptive IIR filter system 40. The FIR filter system 32 and the non-adaptive IIR filter system 40 respectively replicate portions of the echo component (e). The FIR filter system 32 replicates a leading portion of the echo component (e) and the non-adaptive IIR filter system 40 replicates the remaining or tail portion of the echo component (e). Such an arrangement is particularly useful in systems wherein the echo component (e) characteristically exhibits a generally smooth, monotonically decaying tail, herein referred to as a long-tail echo. The replicated portions of the echo signal (e) are output respectively from the FIR filter system 32 and the non-adaptive IIR filter system 40 and input to a summer 48 which combines these replicated portions to yield a replicated echo signal (e'). The replicated echo signal (e') is then input to signal summer 28 where it is inverted and combined with the transmit signal (y). As a result, the inverted echo replica (e') negates or cancels the echo component (e) of the transmit signal (y) via the summing process. This above process is repeated until the transmit signal (y) output from the signal summer 28 is substantially echo-free (e.g., $e_k \approx 0$).

Figure 2:
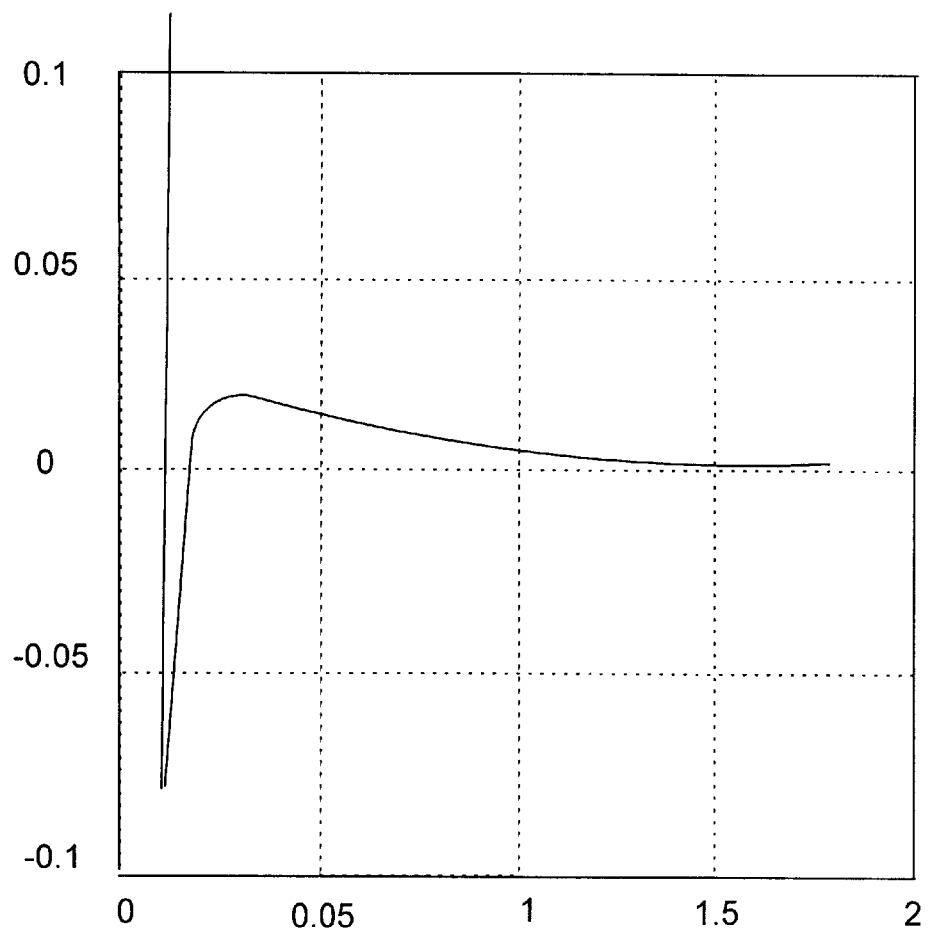
FIG. 2 is a graph depicting a typical impulse response of an echo signal in a WLL system in accordance with the present invention.

Referring briefly to FIG. 2, a typical impulse response for a WLL system is shown. As mentioned above, conventional echo cancellation systems may employ FIR filters which have as many as 32 taps for echo replication. However, the cost of an FIR filter is partially a function of the number of taps and hence such filters tend to be rather costly. The present invention provides for employing a FIR filter system 32 with as little as 7 taps, which is substantially less expensive than conventional FIR filters. As can be seen in FIG. 2, the impulse response of the echo signal (e) varies in amplitude mostly during the first millisecond, thereafter the impulse response becomes substantially smooth. An FIR filter having 7 FIR taps is adequate for replicating the portion of the echo signal (e) corresponding to the first millisecond of the impulse response. Since in WLL systems the impulse response has a smooth long-tail echo after 1ms, the non-adaptive IIR filter 40 can be employed to replicate this portion of the echo signal (e) easily and with low cost. As will be discussed in greater detail below, since the decay of the long-tail echo portion is approximately 0.9, by employing a coefficient of 0.9 in the non-adaptive IIR filter system 40, the entire tail portion of the echo signal (e) can substantially be replicated and combined with the replicated leading portion of the echo signal (e) and then negated from the transmit signal y via the signal summer 28 to result in a substantially echo-free transmit signal ($e_k$).

Figure 3:
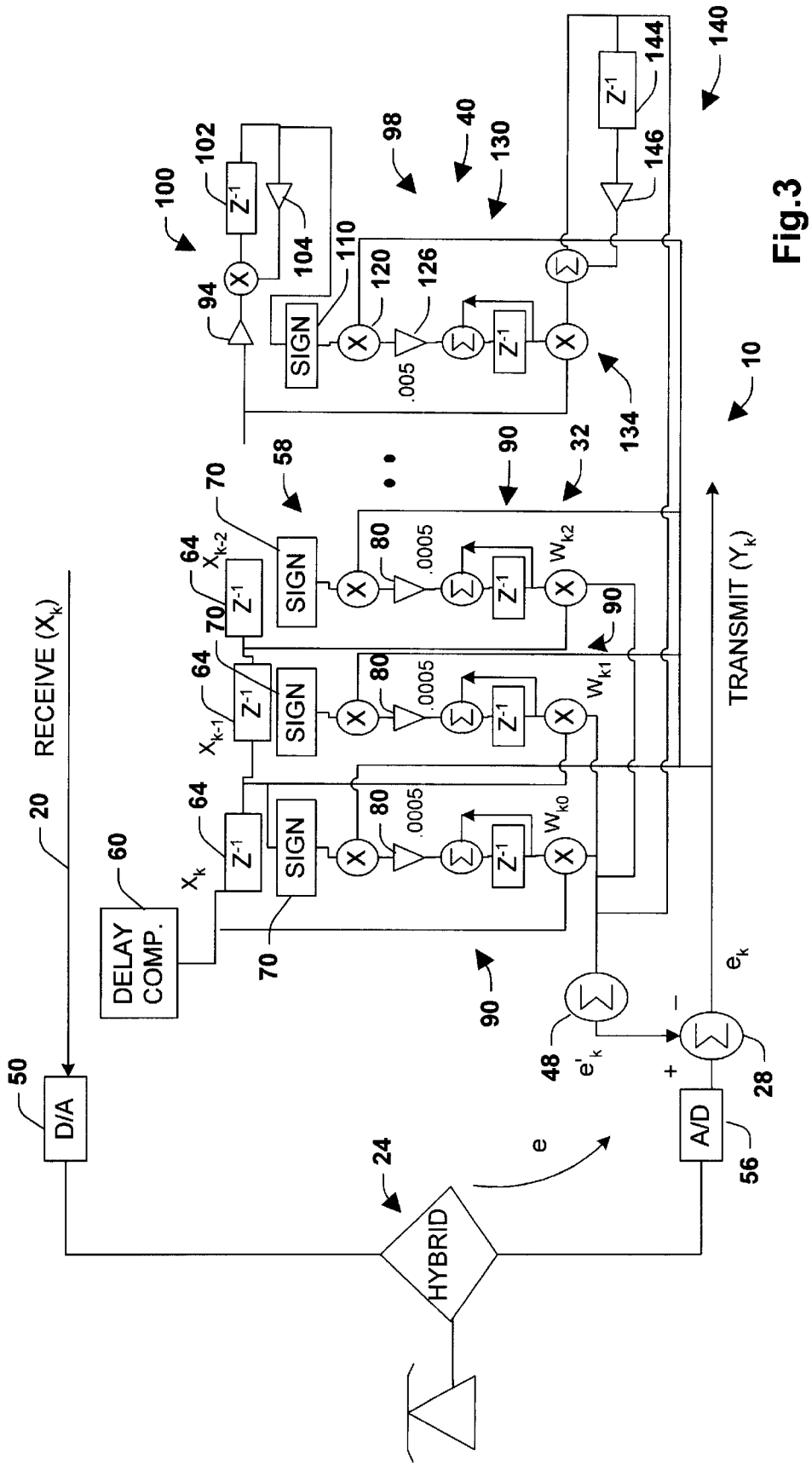
FIG. 3 is a detailed schematic block diagram of one specific embodiment of the automatic balance system depicted generally in FIG. 1.

FIG. 3 is a detailed schematic block diagram of an adaptive FIR filter system 32 cascaded with a non-adaptive IIR filter system 40 to cancel echo signals (e) generated in a WLL system in accordance with one specific aspect of the present invention. The subscript "k" is employed to represent a discrete time sampling interval. A receive digital signal ($x_k$) from an external communications source is input to a digital to analog (D/A) converter 50. The D/A converter 50 converts the digitized receive signal to analog form as is well known in the art. The analog receive signal is input to a 2 to 4 wire hybrid converter 24 which affords for economical subscriber receipt of the receive signal ($x_k$). As noted above, a transmit signal ($y_k$) output by the 2 to 4 wire hybrid converter 24 may have echo signal component (e) therein which is a leakage of the receive signal ($x_k$) (via the 4-wire side of the 2 to 4 wire hybrid converter 24) to the transmit side. Thus, the transmit signal ($y_k$) may include an echo component (e) which may result in degraded communication quality. The transmit signal ($y_k$) is input to an analog to digital (A/D) converter 56 which converts the analog transmit signal ($y_k$) to digital form. The digitized transmit signal ($y_k$) is input to the signal summer 28 which sums an inverted replicated echo component ($e_k'$) from the digitized transmit signal ($y_k$) in order to result in a relatively echo-free transmit signal. As mentioned above, the FIR filter system 32 replicates a first portion of the echo component (e) and the non-adaptive IIR system 40 replicates the remaining or long-tail portion of the echo component (e). These replicated components are combined by summer 48 to yield the replicated echo component ($e_k'$).

Turning now to the FIR filter system 32 and non-adaptive IIR filter system 40 in greater detail, a delay compensator 60 taps off the receive signal ($x_k$) at line 20 and compensates for delays resulting from the D/A converter 50 and A/D converter 56 which are part of the echo path. Use of delay compensators will reduce the number of FIR taps. The FIR filter system 32 may employ (n) number of FIR taps, wherein (n) is an integer value. In the preferred embodiment, the FIR filter system 32 employs 7 FIR taps 58 (with n=0 to 6). The illustrated embodiment shows only 3 FIR taps 58 for sake of clarity, however, it is to be appreciated that any number of FIR taps 58 suitable for carrying out the present invention may be employed.

The receive signal ($x_{k-n}$) is input into each respective FIR tap 58 at (k−n) discrete time sampling intervals. A delay element ($Z^{-1}$) 64 acts a delay element for clocking in and storing the receive signal ($x_{k-n}$) to the FIR taps 58 of the FIR filter system 32. The delay element ($Z^{-1}$) 64 is a shift register and shifts in the receive signal ($x_{k-n}$) to the various FIR taps 58 as is well known in the art. A sign detector 70 receives as an input the clocked in receive signal ($x_{k-n}$) and serves to determine the sign value (+ or −) of the clocked in receive signal ($x_{k-n}$). Typically, automatic balance systems employ a least mean square (LMS) algorithm in order to minimize a mean value of the squared residual error ($e_k^2$). Filter coefficients of the FIR taps are updated according to LMS stochastic steepest descent algorithms which is known in the art. A modification of the LMS algorithm that results in a much simpler calculation is to use a sign-based LMS algorithm or sign algorithm.

In simple, the sign algorithm approach uses the echo component ($e_k$) and the sign of the receive signal ($x_{k-n}$). A sign change function is performed via sign control gate (or a multiplier) 74 on these sign values in order to yield the adaptation direction of the filter coefficient values ($w_{k,n}$) of the respective FIR taps 58. One advantage of employing the sign algorithm to perform filter coefficient updating is that only one multiplication is required instead of two.

The output of the sign control gate 74 is input to a gain block 80. In the preferred embodiment the gain block 80 is set to have a gain of 0.0005 in order to gradually implement echo component replication and avoid problems with clipping and filter instability as is known in the art. The attenuated output of the gain 80 is input into an integrator system 90 which serves to generate the filter coefficients ($w_{k,n}$) of the respective FIR taps 58. The integrator 90 generates the filter coefficients ($w_{k,n}$) in accordance with the equations which will be derived below.

k=time instant $x_{k-n}$=receive signal $h_n$=echo path impulse response $w_{k,n}$=filter coefficients Assuming an echo replication structure as shown in FIG. 3, the error signal ($e_k$) will be given as follows.

$$e_k = \sum_{n=0}^{\infty}(x_{k-n}*h_n) - \left[x_k*w_{k,0} + x_{k-1}*w_{k,1} + x_{k-2}*w_{k,2} + x_{k-3}*w_{k,3} + x_{k-4}*w_{k,4} + x_{k-5}*w_{k,5} + x_{k-6}*w_{k,6} + \frac{x_{k-7}*w_{k,7}}{1-a*Z^{-1}}\right]$$

where $\sum_{n=0}^{\infty}(x_{k-n}*h_n)$ is the echo ($e$);

$x_{k-n}*w_{k,n}$ is the FIR portion;

$x_{k-7}*\frac{w_{k,7}}{1-a*Z^{-1}}$ is the IIR filter;

$a=0.9$

Rearrangement and expansion of the IIR term yields $$e_k = \sum_{n=0}^{6} x_{k-n}*(h_n - w_{k-n}) + \sum_{n=7}^{\infty}(x_{k-n}*h_n) - x_{k-7}*w_{k,7}(1 + a*z^{-1} + a^2*Z^{-2} + a^3*Z^{-3} + \ldots)$$

Finally $$e_k = \sum_{n=0}^{6}(x_{k-n}*h_n - w_{k-n}) + [x_{k-7}*(h_7 - w_{k,7}) + x_{k-8}*(h_8 - a*w_{k,7}) + x_{k-9}*(h_9 - a^2*w_{k,7}) + \ldots ]$$

For n=0 to 6, the FIR filter coefficients for the first 7 taps 58 are determined based on the following equations. The derivative (or gradient) of the error energy represents the direction and magnitude of the adaptation in order to reach minimum energy. To minimize the error energy ($e_k$), the following derivative is evaluated after each adaptation. When the derivative equals zero, minimum error energy is reached.

$$\frac{\partial e_k^2}{\partial w_{k,n}} = -2*e_k*x_{k-n}$$

Therefore, the gradient adaptation algorithm for the first 7 taps 58 (i.e, n=0 to 6) of the FIR filter system 32 is as follows, so that the adaption will move in the direction of minimizing error signal energy and eventually zero error energy.

$$w_{k+1,n} = w_{k,n} + \Delta*e_k*x_{k-n}$$

where $\Delta$ is the adaptation step size.

For a sign based design, the gradient adaptation algorithm can be simplified to:

$$w_{k+1,n} = w_{k,n} + \Delta*e_k*\text{sign}(x_{k-n})$$

wherein only the sign of the receive signal ($x_{k-n}$) is employed rather than the amplitude. Once the filter coefficients ($wk_{k,n}$) of the respective FIR taps 58 are determined (meaning error signal energy equals zero), they can be employed to replicate portions of the leading section of the echo component in accordance with the above equations.

Returning back to FIG. 3, the non-adaptive IIR filter system 40 will now be discussed. As mentioned above the non-adaptive IIR filter system 40 is non-adaptive and provides for a simple means for replicating a long-tail portion of the echo component ($e$). The long-tail portion of the echo signal of FIG. 2 is monotonically decaying and can be represented by a decay rate of 0.9. Turning now to the non-adaptive IIR filter system 40 in detail, receive signal ($x_{k-7}$) is input to a gain block 94 with a gain of 0.1. It will be appreciated that the gain of gain block 94 may be set to any suitable value. One purpose of the gain block 94 is to attenuate the receive signal before clocking it into the IIR filter control block 98 in order to avoid clipping and saturation. The receive signal ($x_{k-7}$) has a value of n=7 because the FIR filter system 32 of this example employs 7 taps (n=0 to 6).

The attenuated output of the gain block 94 is input to an integrator 100 which serves to clock in the receive signal ($x_{k-7}$) via shift register 102 in connection with a gain block 104 set at a gain of 0.9. The gain of 0.9 is needed in order to balance the non-adaptive gain of 0.9 employed to replicate the decaying long-tail portion of the echo component (e). The output of the summation system 100 is input to a sign detector 110 which receives as an input the attenuated clocked in integrated receive signal ($0.1*[x_{k-7}+(0.9)*x_{k-8}+(0.9)^2*x_{k-9}+(0.9)^3*x_{k-10}+ \ldots ]$) and serves to determine the sign value (+ or −) of this signal.

As mentioned above, the sign algorithm approach uses the magnitude of the residual error component ($e_k$) and the sign of the receive signal ($x_{k-7}$). A multiplication function is performed via a sign multiplier 120 on these sign values in order to yield the moving direction of the coefficient values ($w_{k,7}$) of the respective IIR filter tap 98 of the non-adaptive IIR filter system 40. One advantage of employing the sign algorithm to perform coefficient updating is that only one multiplier is required to perform an update.

The output of the sign multiplier 120 is input to a gain block 126. In the preferred embodiment the gain block 126 is set to have a gain of 0.005 in order to control speed of coefficient adaption. It should be noted that the gain of amplifier 126 is ten times greater than the gain of amplifier 80 in order to compensate for the attenuation resulting from the 0.1 gain of amplifier 94. The attenuated output of the amplifier 126 is input into an integrator system 130 which serves to generate the filter coefficient ($W_{k,7}$) of the respective IIR filter tap 98.

The output ($W_{k,7}$) of the integrator 130 is multiplied via multiplier 134 with the receive signal ($x_{k-7}$) and then input to another integrating circuit 140 (which includes a delay element ($Z^{-1}$) 144 and amplifier 146 with a gain=0.9 and a summer) in order to replicate the long echo tail by extending $w_{k,7}$ with a decay rate of 0.9. The integrators 130 and 140 generate the filter coefficients ($w_{k,n}$) for n=7 (ie., the last tap) and replicate the echo tail, based on the following derivations, which explains why the particular IIR structure is used. The derivative (or gradient) of the error energy represents the direction and magnitude of the adaptation in order to reach minimum energy. To minimize the error energy $e_k$, the following derivative is evaluated after each adaptation. When the derivative equals zero, minimum error energy is reached.

$$\frac{\partial e_k^2}{\partial w_{k,7}} = -2*e_k*(x_{k-7} + a*x_{k-8} + a^2*x_{k-9} + \ldots )$$

This determines the adaption algorithm as follows for the IIR tap (n=7) which move in the direction of minimizing $e_k^2$.

$$w_{k+1,7} = w_{k,7} + \Delta * e_k * \sum_{n=7}^{\infty} x_{k-n} * a^{n-7}$$

where a=0.9, and $\Delta$ is the adaptation step size (e.g., 0.005).

For a sign based design, the algorithm may be simplified to:

$$w_{k+1,7} = w_{k,7} + \Delta * e_k * \text{sign} \sum_{n=7}^{\infty} x_{k-n} * a^{n-7}$$

where a=0.9.

Once the filter coefficients ($w_{k,n}$) of the respective IIR tap 98 is determined as ($e_k^2$) approaches zero, they can be employed to replicate the long-tail portion of the echo component (e) in accordance with the above equations.

The gain of the amplifier 146 is set to 0.9 so as to model the decay rate of the long-tail portion of the echo signal (e). As a result, the present invention affords for employment of a simple, inexpensive non-adaptive IIR filter system 40 as compared to conventional IIR filter systems which are adaptive. It is to be appreciated that the gain of amplifiers 104 and 146 may be set to any value suitable for modeling the decay rate of a portion of an echo signal (e). The outputs (i.e., replicated portions of the echo component (e)) of all the FIR taps 58 and IIR tap 98 are combined via summer 48 to result in the replicated echo signal ($e_k'$) which is inverted and combined with the transmit signal ($y_k$) via signal summer 28 to result in a transmit signal ($y_k$) that is substantially free of the echo component (e).

Thus, in summary the present invention provides for canceling an echo component (e) from a transmit signal ($y_k$) output by a 2 to 4 wire hybrid circuit 24 of an WLL system. The echo component (e) is replicated by an automatic balance system 10 of the present invention. The automatic balance system 10 includes an FIR filter system 58 which replicates a first portion of the echo component (e), and a non-adaptive IIR filter system 40 operatively coupled to the FIR filter system 32 which replicates a long-tail portion of the echo component (e). The replicated portions of the echo component (e) output by the FIR filter system 32 and the non-adaptive IIR filter system 40 are combined by the summer 48 to result in the replicated echo component ($e_k'$). The replicated echo component ($e_k'$) is inverted and combined with the transmit signal ($y_k$) via summer 28. The inverted replicated echo component ($e_k'$) serves to negate the actual echo residual component ($e_k$) that is degrading the transmit signal ($y_k$). The echo component replication/negation process is repeated until the echo residual ($e_k$) of the transmit signal ($y_k$) is about equal to zero ($e_k \approx 0$) which corresponds to a substantially echo-free transmit signal ($y_k$).

Since WLL systems typically exhibit impulse responses of echo signals having a long smooth monotonically decaying tail, the non-adaptive IIR filter system 40 may be employed to replicate that portion of the echo signal (e). The implementation of a non-adaptive IIR filter system 40 provides for a simple filtering system that is simpler, less expensive and has fewer stability problems as compared to adaptive IIR filters.

Those skilled in the art will recognize that the embodiment(s) described above and illustrated in the attached drawings are intended for purposes of illustration only and that the subject invention may be implemented in various ways. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for echo cancellation comprising:

using a finite impulse response (FIR) filter system operatively coupled to a 4-wire section of a 2 to 4 wire conversion system, the FIR filter system including at least one FIR tap for replicating a leading portion of an echo signal, the leading portion of the echo signal having a duration of about 1 ms;

using a non-adaptive infinite impulse response (IIR) filter system, operatively coupled to the FIR filter system, to replicate a long-tail portion of the echo signal, the non-adaptive IIR filter system further including at least one amplifier, the at least one amplifier corresponding to a decay rate of the long-tail portion of the echo signal, the decay rate being about 0.9;

using a first summer, operatively coupled to the FIR filter system and non-adaptive IIR filter system, to combine the output replicated portions of the echo signal from the FIR filter system and the IIR filter system to generate a replicated echo signal; and using a second summer to combine an inverted replicated echo signal with the transmit signal so as to substantially negate an echo signal component of the transmit signal.

2. The method of claim 1, further comprising setting the gain of the at least one amplifier to correspond to a decay rate of the tail portion of the echo signal.

3. The method of claim 1, further comprising generating an initial coefficient of the non-adaptive IIR filter system utilizing a least means square (LMS) algorithm.

4. The method of claim 1, further comprising generating an initial coefficient of the non-adaptive IIR filter system utilizing a sign based least means square (LMS) algorithm.

5. The method of claim 1, further comprising determining at least one filter coefficient ($w_{k,n}$) for the at least one finite impulse response (FIR) tap based on the equation:

$$w_{k+1,n} = w_{k,n} + \Delta * e_k * x_{k-n}$$

wherein k represents a discrete time sampling interval; n is a filter tap number; $e_k$ is the error signal; $\Delta$ is an adaptation step size; and $x_k$ is a receive signal.

6. The method of claim 1, further comprising determining at least one filter coefficient ($w_{k,n}$) for the at least one finite impulse response (FIR) tap based on the equation:

$$w_{k+1,n} = w_{k,n} + \Delta * e_k * \text{sign}(x_{k-n})$$

wherein k represents a discrete time sampling interval; n is a filter tap number; $e_k$ is the echo signal; and $\text{sign}(x_k)$ is a sign value of a receive signal ($x_k$).

7. The method of claim 1, further comprising determining an initial coefficient ($w_{k,n}$) for the non-adaptive IIR filter system based on the equation:

$$w_{k+1,7} = w_{k,7} + \Delta * e_k * \sum_{n=7}^{\infty} x_{k-n} * a^{n-7}$$

wherein k represents a discrete time sampling interval; $e_k$ is the error signal; and $x_k$ is a receive signal.

8. The method of claim 1, further comprising determining a filter coefficient ($w_{k,n}$) for the non-adaptive IIR filter system based on the equation:

$$w_{k+1,7} = w_{k,7} + \Delta * e_k * \text{sign} \sum_{n=7}^{\infty} x_{k-n} * a^{n-7}$$

wherein k represents a discrete time sampling interval; $e_k$ is the echo signal; and $\text{sign}(x_k)$ is a sign value of a receive signal ($x_k$).

9. A system for echo cancellation comprising:

a finite impulse response (FIR) filter system operatively coupled to a 4-wire section of a 2 to 4 wire conversion system, the FIR filter system including at least one FIR tap adapted to replicate a leading portion of an echo signal, the leading portion of the echo signal having a duration of about 1 ms;

a non-adaptive infinite impulse response (IIR) filter system, operatively coupled to the FIR filter system, the non-adaptive infinite impulse response (IIR) filter system being adapted to replicate a long-tail portion of the echo signal, the non-adaptive IIR filter system further including at least one amplifier, the at least one amplifier corresponding to a decay rate of the long-tail portion of the echo signal, the decay rate being about 0.9;

a first summer operatively coupled to the FIR filter system and non-adaptive IIR filter system, the first summer being adapted to combine the output replicated portions of the echo signal from the FIR filter system and the IIR filter system to generate a replicated echo signal; and a second summer being adapted to combine an inverted replicated echo signal with the transmit signal so as to substantially negate an echo signal component of the transmit signal.

10. The system of claim 9, wherein a gain of the at least one amplifier corresponds to a decay rate of the long-tail portion of the echo signal.

11. The system of claim 9, wherein a generation of an initial coefficient of the non-adaptive IIR filter system is a least means square (LMS) algorithm.

12. The system of claim 9, wherein a generation of an adaptation algorithm for the non-adaptive IIR filter system is a sign based least means square (LMS) algorithm.

13. The system of claim 9, wherein a filter coefficient ($w_{k,n}$) for the FIR filter system is determined based on the equation:

$$w_{k+1,n} = w_{k,n} + \Delta * e_k * x_{k-n}$$

wherein k represents a discrete time sampling interval; n is a filter tap from (n=0 to 6); $e_k$ is an error signal; and $x_k$ is a receive signal.

14. The system of claim 9, wherein a filter coefficient ($w_{k,n}$) for the FIR filter system is determined based on the equation:

$$w_{k+1,n} = w_{k,n} + \Delta * e_k * \text{sign}(x_{k-n})$$

wherein k represents a discrete time sampling interval; n is a filter tap from (n=0 to 6); $e_k$ is an error signal; and $\text{sign}(x_k)$ is a sign value of a receive signal ($x_k$).

15. The system of claim 9, wherein a filter coefficient ($w_{k,n}$) for the non-adaptive IIR filter system is determined based on the equation:

$$w_{k+1,7} = w_{k,7} + \Delta * e_k * \sum_{n=7}^{\infty} x_{k-n} * a^{n-7}$$

wherein k represents a discrete time sampling interval; n is a filter tap (n=7); $e_k$ is an error signal; and $x_k$ is a receive signal.

16. The system of claim 9, wherein a filter coefficient ($w_{k,n}$) for the non-adaptive IIR filter system is determined based on the equation:

$$w_{k+1,7} = w_{k,7} + \Delta * e_k * \text{sign} \sum_{n=7}^{\infty} x_{k-n} * a^{n-7}$$

wherein k represents a discrete time sampling interval; n is a filter tap and (n=7); $e_k$ is an error signal; and sign($x_k$) is a sign value of a receive signal ($x_k$).

17. An automatic balance system as set forth in claim 9, in combination with a wireless local loop communication system, said system including a hybrid conversion system to which the transmit signal is sent and from which the echo signal is reflected.

* * * * *

UNITED STATES PATENT AND TRADEMARK OFFICE
CERTIFICATE OF CORRECTION

PATENT NO. : 6,256,383 B1
DATED : July 3, 2001
INVENTOR(S) : Herbert M. K. Chen

It is certified that error appears in the above-identified patent and that said Letters Patent is hereby corrected as shown below:

Column 1,
Line 59, please replace "fmal" with -- final --.

Signed and Sealed this

Twenty-ninth Day of January, 2002

*Attest:*

JAMES E. ROGAN
*Attesting Officer*   *Director of the United States Patent and Trademark Office*